United States Patent
Ishida et al.

(10) Patent No.: US 7,976,047 B2
(45) Date of Patent: Jul. 12, 2011

(54) SPEED SENSOR COLLISION PREVENTION DEVICE

(75) Inventors: Shinichiro Ishida, Wako (JP); Taisuke Nimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 148 days.

(21) Appl. No.: 12/353,428

(22) Filed: Jan. 14, 2009

(65) Prior Publication Data

US 2009/0183957 A1 Jul. 23, 2009

(30) Foreign Application Priority Data

Jan. 23, 2008 (JP) ................................ 2008-012989

(51) Int. Cl.
*B62K 11/02* (2006.01)
(52) U.S. Cl. ................... 280/284; 280/288; 180/227
(58) Field of Classification Search .................. 280/284, 280/288; 180/227
See application file for complete search history.

(56) References Cited

U.S. PATENT DOCUMENTS

| | | | | |
|---|---|---|---|---|
| 7,510,040 B2* | 3/2009 | Takayanagi et al. | .......... | 180/226 |
| 2002/0094906 A1* | 7/2002 | Jordan | .......... | 475/254 |
| 2003/0234163 A1* | 12/2003 | Ichida et al. | .......... | 200/4 |
| 2006/0066294 A1* | 3/2006 | Ishida | .......... | 324/166 |
| 2006/0100045 A1* | 5/2006 | Fukuda | .......... | 474/70 |

FOREIGN PATENT DOCUMENTS

JP 2007-78549 A 3/2007

* cited by examiner

*Primary Examiner* — Paul N Dickson
*Assistant Examiner* — Marlon A Arce
(74) *Attorney, Agent, or Firm* — Westerman, Hattori, Daniels & Adrian, LLP

(57) ABSTRACT

A motorcycle includes a swing arm swingably provided on a body frame, a wheel rotatably provided at an end part of the swing arm, a disk plate attached to the wheel, a caliper bracket provided on the body frame side of the vehicle, a disk brake caliper provided on the caliper bracket, and a wheel speed sensor attached to the caliper bracket. The wheel speed sensor is disposed between the swing arm and the wheel. The wheel speed sensor and the swing arm overlap one other in a side view of the vehicle.

7 Claims, 7 Drawing Sheets

SPEED SENSOR COLLISION PREVENTION DEVICE

TECHNICAL FIELD

The present invention relates to a motorcycle equipped with a wheel speed sensor for detecting the rotating speed of a wheel.

BACKGROUND OF THE INVENTION

A motorcycle including a disk brake caliper for applying a braking force to a wheel, a caliper bracket for fixing the disk brake caliper to the body frame side, and a wheel speed sensor attached to the caliper bracket in order to detect the rotating speed of the wheel is known. See, e.g., Japanese Patent Laid-open No. 2007-78549 ("JP '549").

In FIG. 3 of JP '549, a rear wheel 14 (the same reference symbols as in the document are used herein) is rotatably (swingably) mounted to an end part of a swing arm 12 through an axle 15, and a brake caliper 28 is mounted to the swing arm 12 through a brake caliper holder 27 extending toward the lower side. A rotation sensor 40 for detecting the rotating speed of the rear wheel 14 is mounted to the brake caliper holder 27, and a blocking wall 53 for receiving a foreign matter G such as a small stone flung up from a road surface during running is integrally provided in the periphery of the rotation sensor 40.

The blocking wall 53 described in JP '549 prevents foreign matters G flying from the lower side, the front side or the rear side, from colliding against the rotation sensor 40. However, the addition of the blocking wall 53 leads to an increase in vehicle weight.

Also, since the rotation sensor 40 is exposed to a lateral side of the vehicle, collision of a foreign matter against the rotation sensor 40 cannot be obviated in the case where the foreign matter projects toward the rotation sensor 40 from the exposed lateral side. Thus, an additional member for covering the rotation sensor 40 or the like member may be separately provided in order to reduce the likelihood of foreign matter colliding against the rotation sensor 40. However, this leads to a further increase in the number of component parts and/or increase in overall vehicle weight.

SUMMARY OF THE INVENTION

One object of the present invention to provide, in relation to a motorcycle having a wheel speed sensor, a device/method for lowering the possibility of collision of a foreign matter against the wheel speed sensor, without increasing the number of component parts or the vehicle weight.

According to one aspect of the present invention, a motorcycle includes a swing arm swingably provided on a body frame, a wheel rotatably provided at an end part of the swing arm, a disk plate attached to the wheel, a caliper bracket provided on the body frame side, a disk brake caliper for braking the wheel by clamping the disk plate, the disk brake caliper provided on the caliper bracket, and a wheel speed sensor attached to the caliper bracket for detecting the speed of the wheel. The wheel speed sensor is disposed between the swing arm and the wheel, and the wheel speed sensor and the swing arm are disposed to overlap with each other in side view of the vehicle.

This arrangement of the wheel speed sensor ensures that in the case where a foreign matter such as a small stone projects toward the wheel speed sensor from a lateral side of the vehicle, the foreign matter can be received (blocked) by a side wall of the swing arm (e.g., it is not necessary to separately provide means such as a guard member on the lateral side of the wheel speed sensor). Accordingly, the possibility of collision of foreign matter against the wheel speed sensor can be lowered, without leading to an increase in the number of component parts or an increase in vehicle weight.

According to another aspect of the present invention, the disk brake caliper is disposed on the lower side of the wheel speed sensor. Thus, when a foreign matter projects from the lower side of the vehicle toward the wheel speed sensor or the like, the foreign matter can be received (blocked) by the disk brake caliper (e.g., the possibility of direct collision of a foreign matter against the wheel speed sensor or the like is reduced.) Accordingly, a foreign matter flying from a lateral side or the lower side can be prevented from colliding against the wheel speed sensor, without separately providing a protective member for exclusive use for protecting the wheel speed sensor.

According to another aspect of the present invention, an engaging part where the caliper bracket and the swing arm are engaged with each other is disposed on the upper side of the wheel speed sensor. Thus, when a foreign matter projects from the upper side of the vehicle, the foreign matter can be received (blocked) by the engaging part. Therefore, the possibility of foreign matter colliding against the wheel speed sensor can be reduced without providing a separate (additional) protective member for protecting the wheel speed sensor.

Also, since the wheel speed sensor is covered by disposing the engaging part on the upper side of the wheel speed sensor in addition to the structures on the left and right sides, the front and rear sides and the lower side, external visibility of the wheel speed sensor can be lowered and, hence, appearance quality of the vehicle can be enhanced.

According to another aspect of the present invention, the swing arm includes a drive shaft case for accommodating a drive shaft, and a final gear case for accommodating a final gear, and the wheel speed sensor and the final gear case are so disposed as to overlap with each other in side view of the vehicle. Thus, when a foreign matter projects from a lateral side toward the wheel speed sensor, the foreign matter can be received (blocked) by a side wall of the final gear case. Therefore, the possibility of collision of foreign matter against the wheel speed sensor or a cable or the like extending from the wheel speed sensor can be lowered, without separately providing means such as a guard member on the lateral side of the wheel speed sensor.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
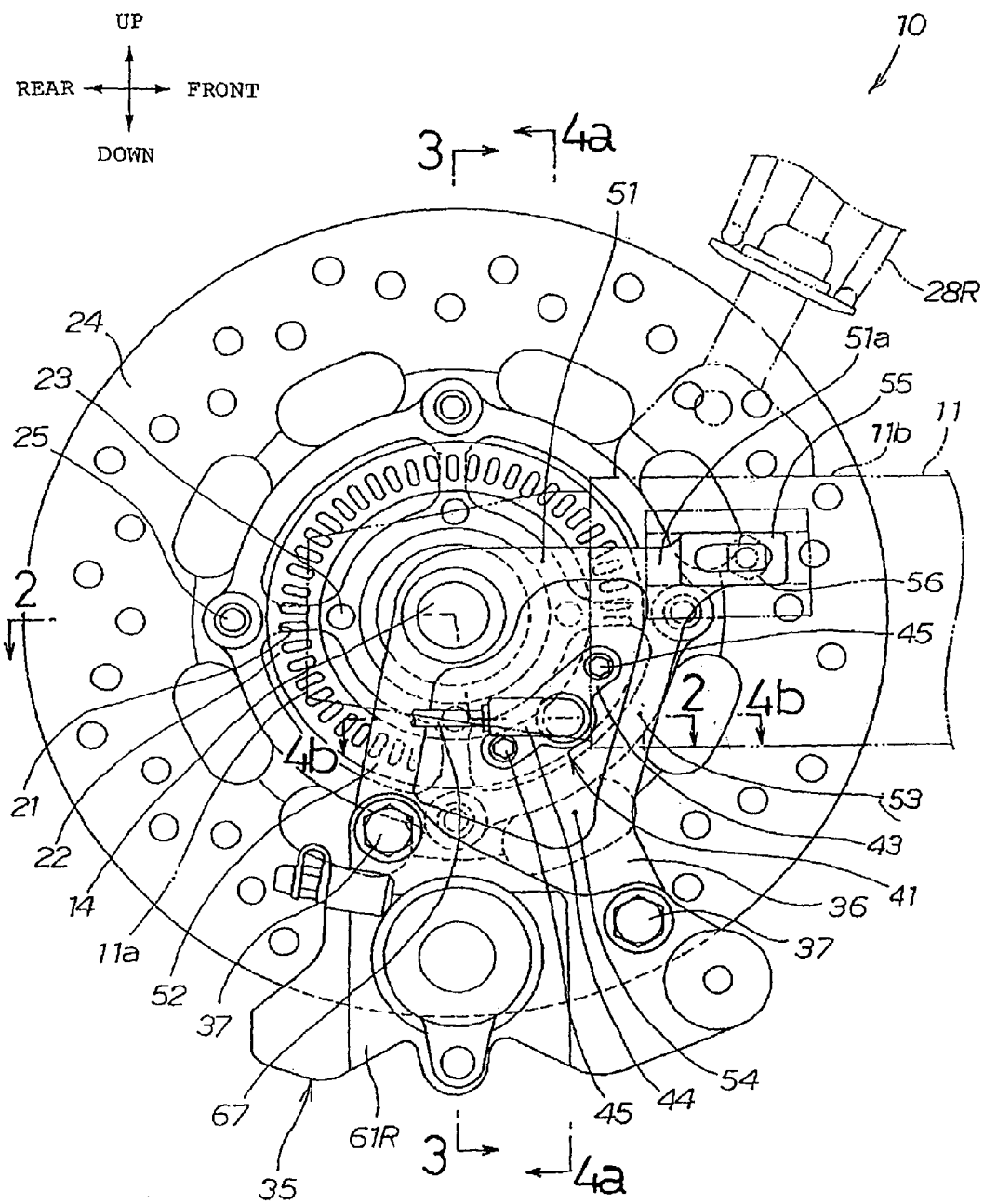
FIG. 1 is a side view of a motorcycle equipped with a wheel speed sensor.

Embodiments of the invention will be described below with reference to the accompanying drawings. In particular, a system obtained by applying the present invention to a rear wheel of a motorcycle will be described. In the drawings and the embodiment, the terms "UP," "DOWN," "FRONT," "REAR," "LEFT" and "RIGHT" mean the sides or directions as viewed from the driver seated on the motorcycle. Incidentally, the drawings should be viewed according to the posture of symbols.

Figure 2:
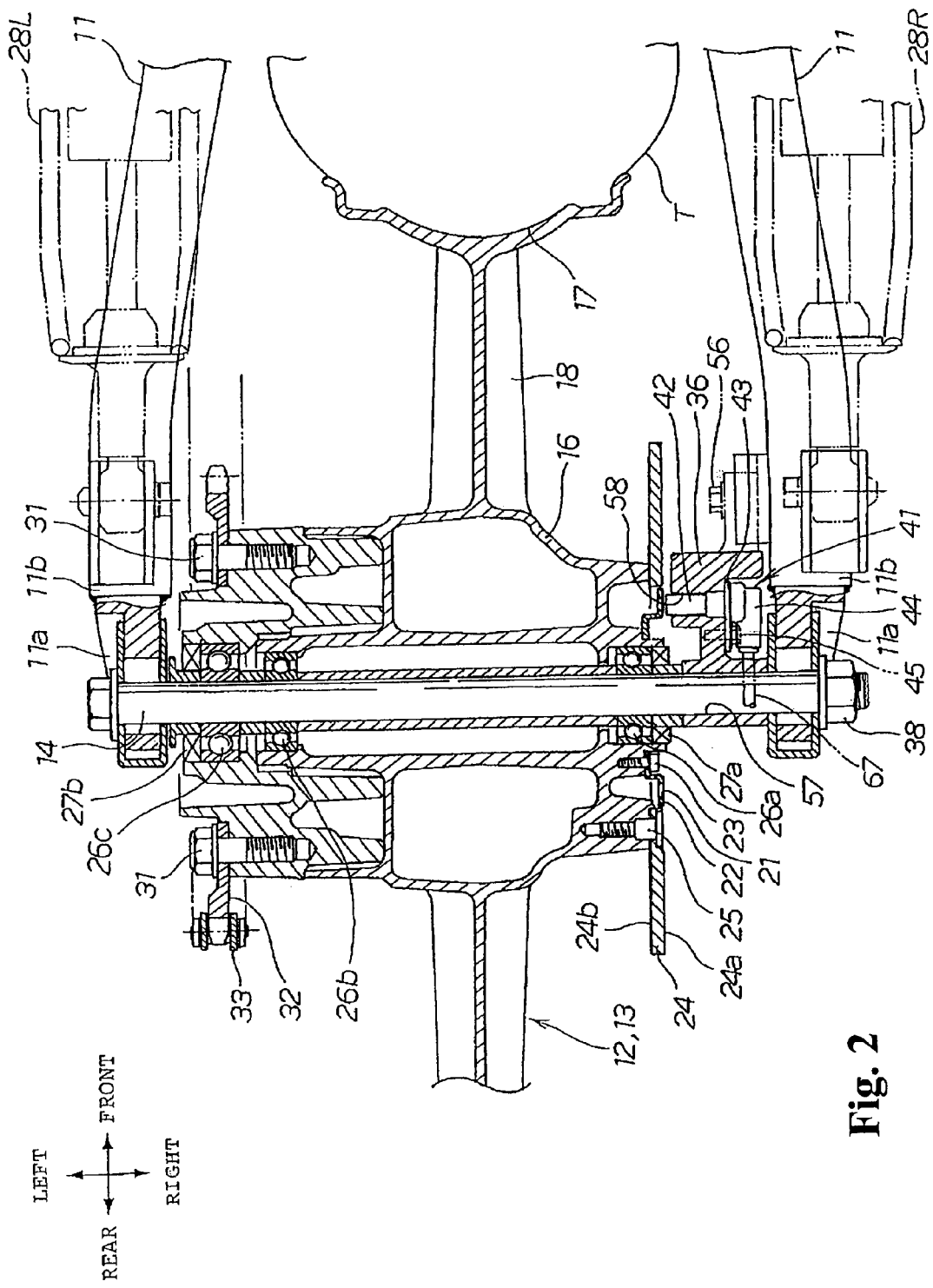
FIG. 2 is a sectional view taken along line 2-2 of FIG. 1.
Figure 3:
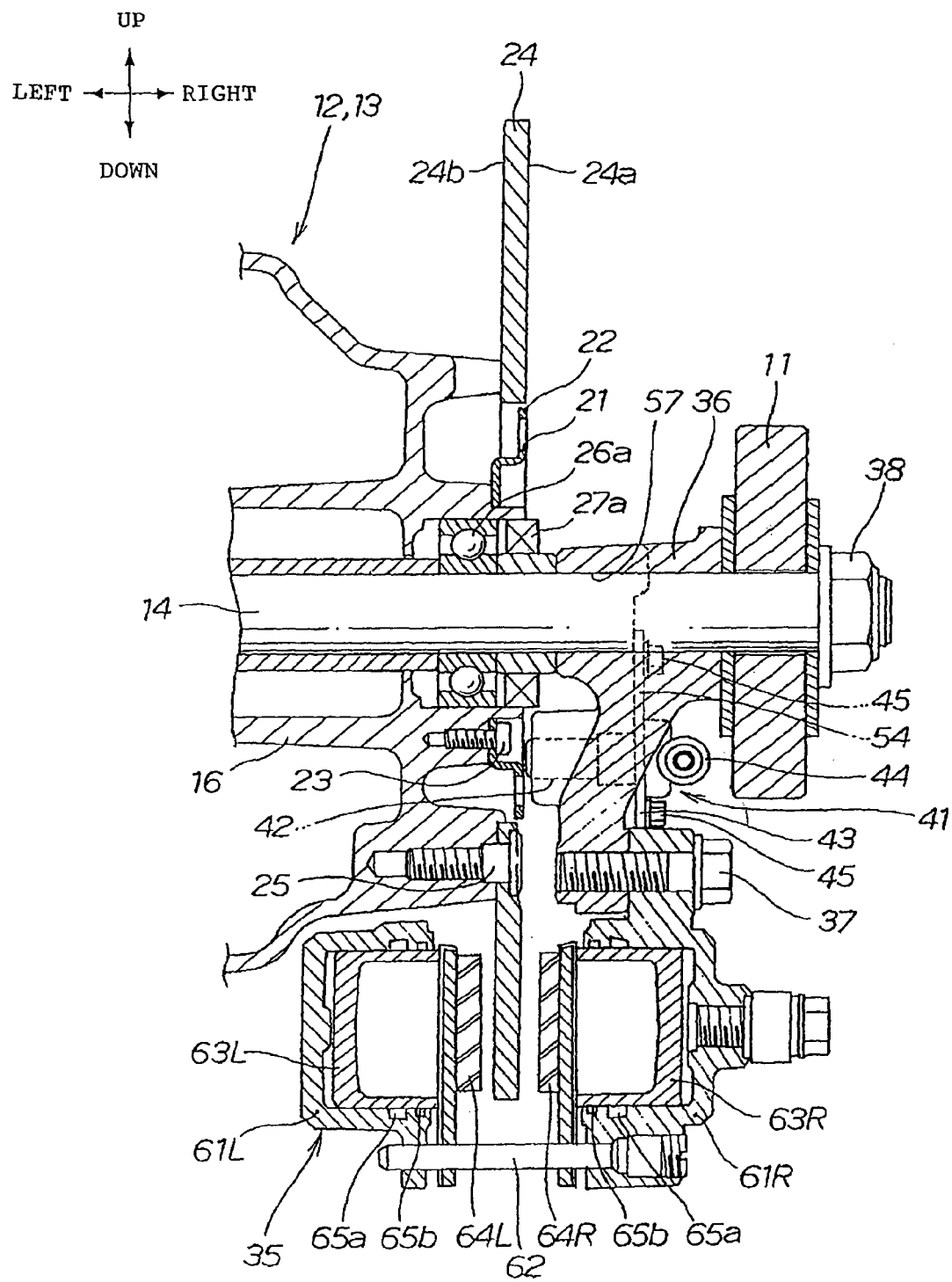
FIG. 3 is a sectional view taken along line 3-3 of FIG. 1.

FIG. 1 is an essential part side view of a motorcycle equipped with a wheel speed sensor, FIG. 2 is a sectional view taken along line 2-2 of FIG. 1, and FIG. 3 is a sectional view taken along line 3-3. Now, description will be made by referring to FIGS. 1 to 3.

A swing arm 11 is provided at a rear part of a body frame constituting the motorcycle 10, and a rear wheel axle 14 for turnably supporting a rear wheel 13 as a wheel 12 is provided at an end part 11a of the swing arm 11. Thus, the rear wheel 13 is turnably attached to the rear wheel axle 14.

The rear wheel 13 as the wheel 12 includes a hub part 16 constituting a central part and supported by the rear wheel axle 14, a rim part 17 which is disposed on the outside of the hub part 16 and to which a tire T is mounted, and an intermediate part 18 for connection between the hub part 16 and the rim part 17.

A wheel speed plate 22 operative to detect the wheel speed by being paired with a wheel speed sensor (described later), formed in a circular disk-like shape, and provided with a multiplicity of radial slits 21 . . . ( . . . represents plurality, here and hereinbelow) in the vicinity of the outer periphery thereof is attached to the hub part 16 through small bolts 23 . . . . A circular disk-like disk plate 24 is attached to the hub part 16 on the outside of the wheel speed plate 22 through plate holding bolts 25 . . . .

Bearings 26a to 26c are interposed between the rear wheel axle 14 and the hub part 16, whereby the hub part 16 is rotatably mounted to the rear wheel axle 14. Symbols 27a, 27b represent seal members. In addition, left and right rear cushions 28L, 28R are interposed between a rear part 11b of the swing arm 11 and the body frame, whereby the rear wheel 13 can be swingably supported.

A sprocket 32 is attached to the hub part 16 through sprocket bolts 31 . . . , a chain 33 is wrapped around the sprocket 32, and a driving force by driving means is transmitted to the hub part 16 of the rear wheel 13, whereby the rear wheel 13 is driven.

The rear wheel axle 14 includes the hub part 16, the disk plate 24 and the wheel speed plate 22 attached to the outside of the hub part 16 to be integral with the hub part 16, a disk brake caliper 35 which is mounted from the outside of the disk plate 24 so as to clamp disk parts 24a, 24b of the disk plate 24 and which clamps the disk plate 24 so as to brake the wheel 12, the swing arm 11 mounted to the outside of the disk brake caliper 35, and an axle nut 38 attached to the outside of the swing arm 11, in this order from the center of the vehicle body toward the right outer side.

The caliper bracket 36 is a member for supporting the disk brake caliper 35 for braking the wheel 12. In this embodiment, the disk brake caliper 35 is attached to a lower part of the caliper bracket 36 through fastening members 37, 37.

The disk plate 24 is attached to the rear wheel 13 provided as the wheel 12, and the disk brake caliper 35 is provided on the body frame side. The disk brake caliper 35 is provided on the side of the body frame, through the caliper bracket 36 therebetween. The wheel speed sensor 41 for detecting the speed of the wheel 12 is attached to the caliper bracket 36 so as to front on slit holes 21 . . . provided in the wheel speed plate 22 serving as the rotation side.

This type of wheel speed sensor 41 is used, for example, in an ABS (Antilock Braking System). In the drawings, a hydraulic brake hose for connection to the disk brake caliper 35 is omitted.

The wheel speed sensor 41 is a member which includes a detecting part 42 disposed to front on the wheel speed plate 22 so as to detect a signal through the slit holes 21 . . . , a flange part 43 holdably provided in the disk brake caliper 35 as a mounting part, and a cap part 44 from which a cable for outputting a signal obtained upon detection by the detecting part 42 is extended. The wheel speed sensor 41 is mounted to a sensor mounting seat part 54 of the disk brake caliper 35 through a sensor mounting bolt 45.

The disk brake caliper 35 is provided with a first rib part 51 extending radially from the rear wheel axle 14 toward the front side of the vehicle, a second rib part 52 similarly extending from the rear wheel axle 14 toward the lower side of the vehicle, and a third rib part 53 being substantially parallel to the second rib part 52 and extending from an end part 51a of the first rib part 51 toward the lower side, so as to provide such a strength as to sufficiently endure a force tending to turn the caliper bracket 36 at the time of braking.

In a region surrounded by the first to third rib parts 51 to 53, the sensor mounting seat part 54 is provided which serves as a seat surface for mounting the wheel speed sensor 41 thereon and which is formed to be thinner than the rib parts 51 to 53.

At the end part 51a of the first rib part 51, an engaging part 55 for holding the caliper bracket 36 on the swing arm 11 is provided. The engaging part 55 is attached to the swing arm 11 along the direction from the inside to the outside of the vehicle through anti-turn bolt 56 so as to prevent the caliper bracket 36 from turning around the rear wheel axle 14 at the time of braking.

In the caliper bracket 36, symbol 57 denotes a hole part which is attached to the rear wheel shaft 14 so as to pass the rear wheel shaft 14 therethrough, and symbol 58 denotes a small hole so bored that the detecting part 42 of the wheel speed sensor 41 can be set to front on the slit holes 21 . . . provided in the wheel speed plate 22.

Now, layout of the wheel speed sensor 41 will be described.

The wheel speed sensor 41 is disposed between the swing arm 11 and the wheel 12, and the wheel speed sensor 41 and the swing arm 11 are so disposed as to overlap with each other in side view of the vehicle.

In addition, the disk brake caliper 35 is disposed on the lower side of the wheel speed sensor 41.

The engaging part 55 where the caliper bracket 36 and the swing arm 11 are engaged with each other is disposed on the front and the upper side of the wheel speed sensor 41.

The second rib part 52 extending substantially downwards from the rear wheel axle 14 and the third rib part 53 disposed on the front side of and substantially in parallel to the second rib part 52 are formed in such directions as to be substantially parallel to each other for fulfilling the basic function of the caliper bracket 36 to hold the disk brake caliper 35 with a predetermined strength, and also have the role as a protective wall for preventing foreign matter coming from the front side or the rear side from colliding against the wheel speed sensor 41.

The disk brake caliper 35 includes, as main components, a right body part 61R and a left body part 61L disposed opposite to the right body part 61R with a bridge bolt 62 therebetween, left and right pistons parts 63L and 63R which are attached respectively to the left and right body parts 61L and 61R and which are driven by a hydraulic pressure generated in a master cylinder (not shown), and left and right brake pads 64L and 64R which are attached respectively to the left and right piston parts 63L and 63R and which clamp the circular disk-like disk plate 24 therebetween at a predetermined time. Symbols 65a and 65b denote piston seals.

The disk brake caliper 35 is disposed on the lower side of the wheel speed sensor 41, which is attached to the caliper bracket 36, and a cable part 67 extending from the wheel speed sensor 41. Incidentally, while the wheel speed sensor is disposed at the rear wheel in this embodiment, it may be disposed at a front wheel while having the same configuration as above.

The operation of the motorcycle equipped with the wheel speed sensor according to the present invention as above-mentioned will be described below.

Figure 4:
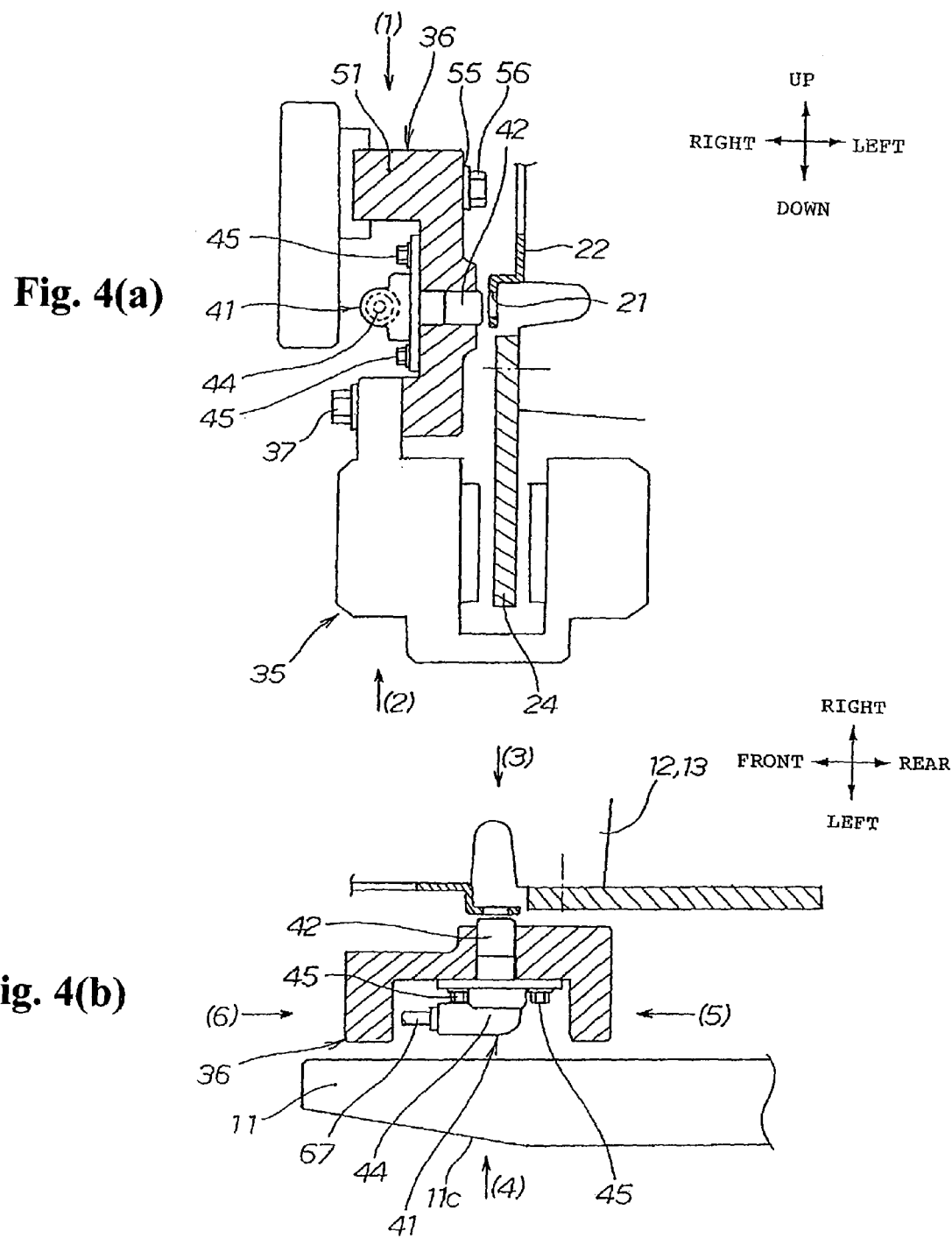
FIGS. 4(a) and 4(b) are an operation illustration in section along line 4a-4a of FIG. 1 and an operation illustration in section along line 4b-4b of FIG. 1.

FIGS. 4(a) and 4(b) are an operation illustration in section along line 4a-4a of FIG. 1 and an operation illustration in section along line 4b-4b of FIG. 1.

In FIG. 4(a), the periphery of the detecting part 42 constituting the wheel speed sensor 41 is covered with the caliper bracket 36, the first rib part 51 is disposed on the upper side of the cap part 44, and the disk brake caliper 35 is disposed on the lower side of the cap part 44.

In the case where a foreign matter flies in the direction of arrow (1) in the figure during running or in other situation, the foreign matter can be received by the first rib part 51, so that the foreign matter such as mud, small stones and gravel can be prevented from colliding against the wheel speed sensor 41.

In addition, the disk brake caliper 35 is disposed on the lower side of the wheel speed sensor 41, so that in the case where a foreign matter such as a small stone flies in the direction of arrow (2) in the figure during running or in other situation, the foreign matter can be received by the disk brake caliper 35. Since the foreign matter is received by the disk brake caliper 35, the possibility of direct collision of the foreign matter on the wheel speed sensor 41 or the cap part 44 constituting the wheel speed sensor 41 can be lowered.

In FIG. 4(b), the wheel speed sensor 41 is disposed between the swing arm 11 and the wheel 12, and the wheel speed sensor 41 and the swing arm 11 are so disposed as to overlap with each other. In the case where a foreign matter such as a small stone flies from the left or right side toward the wheel speed sensor 41, for example, in the direction of arrow (3) in the figure or in the direction of arrow (4) in the figure during running or in other situation, the foreign matter can be received by either of the wheel 12 and a side wall 11c of the swing arm 11.

Therefore, the possibility of collision of a foreign matter against the wheel speed sensor 41 or the cable part 67 or the like connected to the wheel speed sensor 41 can be lowered, without separately providing means such as a guard member in the vicinity of the wheel speed sensor 41 for the purpose of preventing foreign matters from colliding on the wheel speed sensor 41.

According to the present invention, a foreign matter flying from any of the lateral sides, the upper side and the lower side can be prevented from colliding against the wheel speed sensor 41, without separately providing a protective member for exclusive use for protecting the wheel speed sensor 41. Since it is unnecessary to separately provide a member for exclusive use, the possibility of collision of a foreign matter against the wheel speed sensor 41 can be lowered, without leading to an increase in the number of component parts or an increase in vehicle weight.

In addition, the engaging part 55 is disposed for the wheel speed sensor 41 on the upper side of the wheel speed sensor 41. This ensures that in the case where a foreign matter such as a small stone flies from the upper side during running or in other situation, the foreign matter can be received by the engaging part 55, so that the possibility of collision of the foreign matter against the wheel speed sensor 41 can be lowered. In this case, the wheel speed sensor 41 can be protected from collision of a foreign matter thereon, without enlarging too much a rib-shaped part provided on the caliper bracket 36 in the vicinity of the wheel speed sensor 41 or separately providing a guard member for exclusive use. Therefore, a decrease in vehicle weight can be promised.

Further, the engaging part 55 is disposed on the upper side of the wheel speed sensor 41, in addition to the structures on the left and right sides, the front and rear sides and the lower side, and the wheel speed sensor 41 is covered with the engaging part 55. Therefore, the wheel speed sensor 41 can be made more difficult to see from the outside, and appearance quality of the vehicle can be enhanced.

Figure 5:
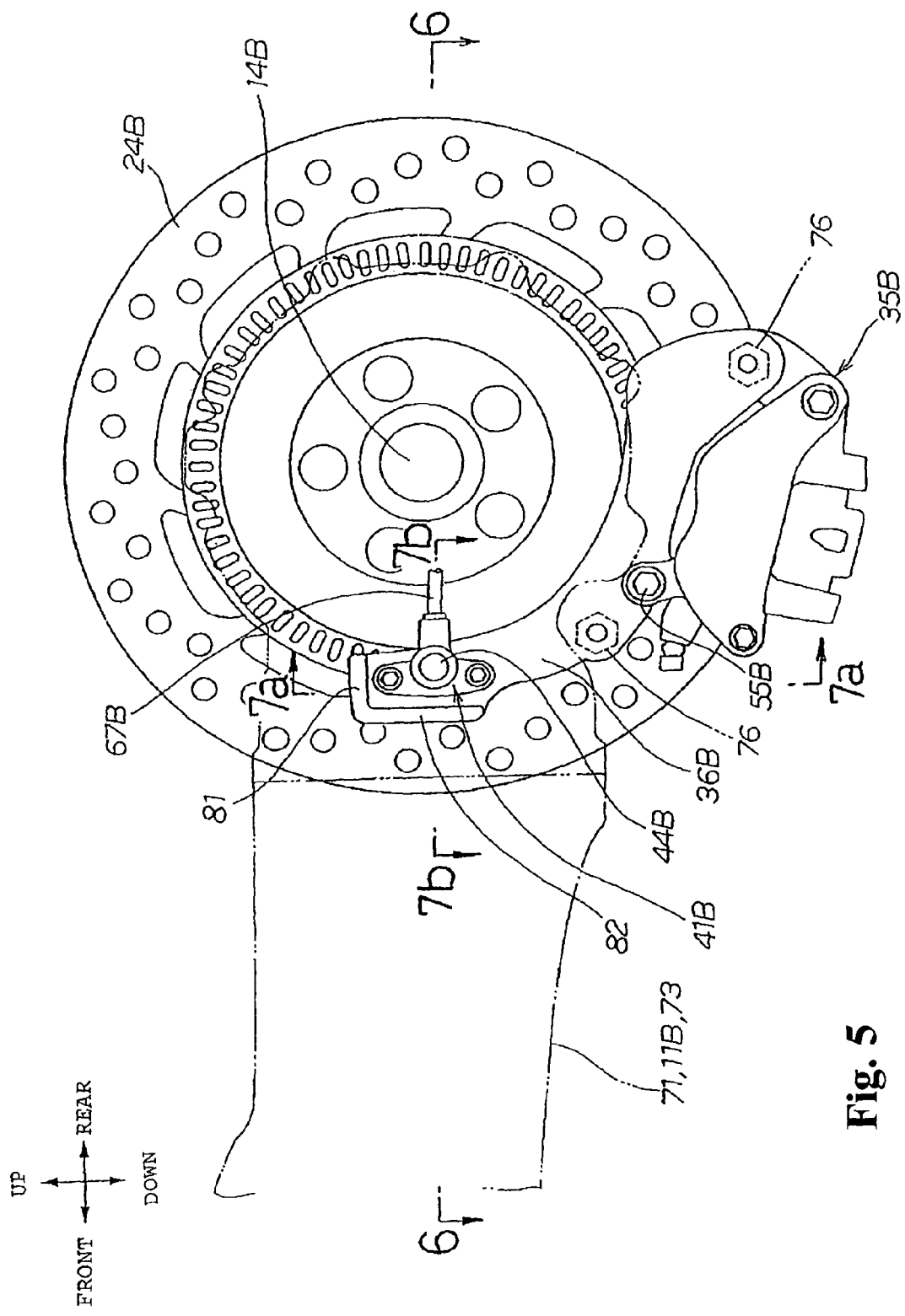
FIG. 5 is a view of another embodiment, corresponding to FIG. 1.
Figure 6:
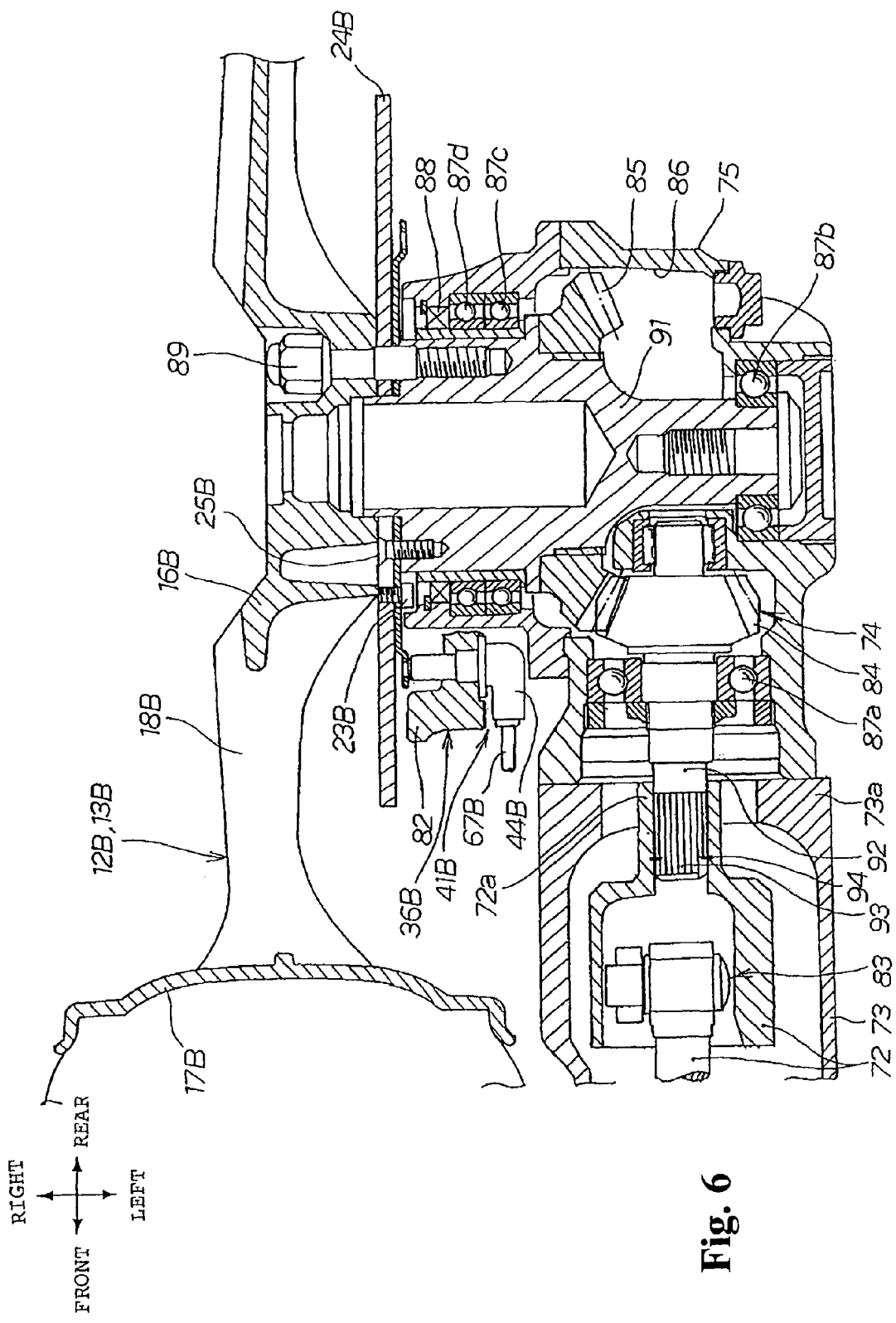
FIG. 6 is a sectional view taken alone line 6-6 of FIG. 5.

FIG. 5 illustrates another embodiment of FIG. 1, and FIG. 6 is a sectional view taken along line 6-6 of FIG. 5. Now, description will be made referring to FIGS. 5 and 6.

Another embodiment differs much from the above-described embodiment in that the driving of a wheel 12B (rear wheel 13B) has been changed from chain drive to shaft drive, the other points being not largely different. The following description will be centered on the differences.

A rear wheel driving part 71 is provided with a drive shaft case 73 which serves also as a swing arm 11B and which accommodates a drive shaft 72 for driving the rear wheel 13B, and a final gear case 75 which is attached to a rear end part 73a of the drive shaft case 73 and which accommodates a pair of final gear sets 74 for conversion of the direction of the driving force. The wheel 12B is turnably mounted to the final gear case 75.

A caliper bracket 36B is attached to an inside surface of the final gear case 75 through fastening bolts 76, 76 set to extend from the inside to the outside, and a wheel speed sensor 41B is attached to the caliper bracket 36B. The wheel speed sensor 41B is disposed between the drive shaft case 73 serving also as the swing arm 11B and the wheel 12B, and the wheel speed sensor 41B and the swing arm 11B are so disposed as to overlap with each other in side view of the vehicle.

In addition, in the caliper bracket 36B, a transverse rib 81 is additionally provided on the upper side of the cap part 44B constituting the wheel speed sensor 41B, and a longitudinal rib 82 is additionally provided on the front side of the cap part 44B.

The disk brake caliper 35B is disposed on the lower side of the wheel speed sensor 41B.

An engaging part 55B where the caliper bracket 36B is engaged with the swing arm 11B is disposed substantially on the lower side of the wheel speed sensor 41.

Here, a rear wheel driving mechanism will be described. A universal joint 83 for enabling slide in the front-rear direction is interposed at an intermediate part of a drive shaft 72, and a final gear set 74 for converting the direction of a driving force is provided between a rear end part 72a of the drive shaft 72 and a rear wheel axle 14B.

The final gear set 74 includes a pinion gear 84 as a first final gear, and a ring gear 85 as a second final gear. A pinion gear shaft 92 having the pinion gear 84 at a rear end part thereof is attached to a rear end part 72a of the drive shaft 72, the ring gear 85 is meshed with the pinion gear 84, and the ring gear 85 is turnably disposed coaxially with the center of the rear wheel axle 14B. Symbol 89 denotes a wheel bolt for attaching the wheel 12B to an output rotating body 91. The ring gear 85 is attached to the output rotating body 91. The pinion gear 84 and the pinion gear shaft 92 are formed as one body with each other. In the figure, symbol 93 denotes a spline part which is formed in the pinion gear shaft 92 and serves as a connecting part for connection with the drive shaft 72, and symbol 94 denotes a C-clip.

A driving force transmitted to the drive shaft 72 is transmitted to the pinion gear 84 through the pinion gear shaft 92, is then transmitted to the ring gear 85 meshed with the pinion gear 84, is transmitted to the output rotating body 91 fixed to the ring gear 85, and is transmitted to a hub part 16B of the rear wheel 13B.

Incidentally, the universal joint 83 interposed in the drive shaft 72 is a tripod-type constant velocity joint having a slide structure capable of sliding in the axial direction of the drive shaft 72. Other than this, the universal joint 83 may be a universal joint having a slide structure, and may be used as a universal joint whether it is of a non-constant velocity type or of a constant velocity type.

A driving chamber 86 for accommodating the final gear set 74 is formed on the inside of the final gear case 75. The driving chamber 86 is filled with oil. Symbols 87a to 87d denote bearings, and symbol 88 denotes a seal member. The above structure ensures that the driving force of the drive shaft 72 is smoothly transmitted to the rear wheel 13B.

Figure 7A:
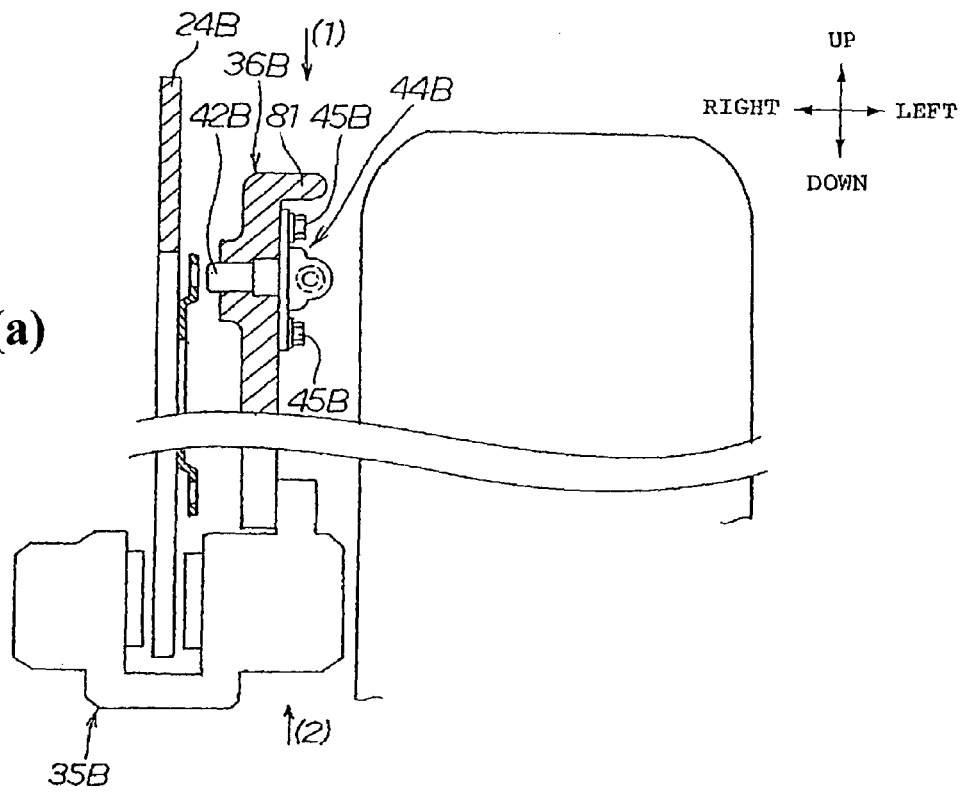
FIGS. 7(a) and 7(b) are an operation illustration in section along line 7a-7a of FIG. 5 and an operation illustration in section along line 7b-7b of FIG. 5.
Figure 7B:
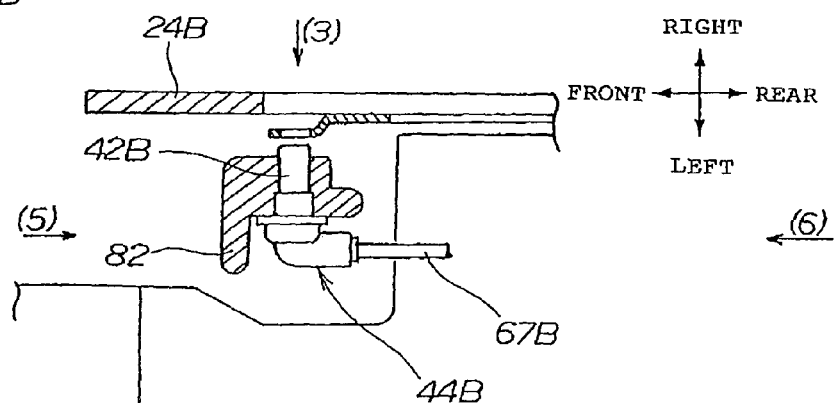

FIGS. 7(a) and 7(b) are an operation illustration in section along line 7a-7a of FIG. 5 and an operation illustration in section along line 7b-7b of FIG. 5.

In FIG. 7(a), the periphery of a detecting part 42B constituting a wheel speed sensor 41B is covered with a caliper bracket 36B, a transverse rib 81 is disposed on the upper side of a cap part 44B, and a disk brake caliper 35B is disposed on the lower side of the cap part 44B.

Therefore, in the case where a foreign matter flies in the direction of arrow (1) of the figure during running or in other situation, the foreign matter is received by the transverse rib 81. Accordingly, it is possible to prevent collision of a foreign matter such as mud, small stones and gravel against the wheel speed sensor 41. Besides, in the case where a foreign matter flies in the direction of arrow (2) of the figure, the foreign matter is received by the disk brake caliper 35B. Therefore, the foreign matter can be prevented from colliding on the wheel speed sensor 41B. Specifically, since the foreign matter is received by the disk brake caliper 35B, the possibility of direct collision of a foreign matter on the cap part 44B of the wheel speed sensor 41B or the like can be lowered.

In FIG. 7(b), the wheel speed sensor 41B is disposed between the swing arm 11B and the wheel 12B, and the wheel speed sensor 41B and the swing arm 11B are so disposed as to overlap with each other. In the case where a foreign matter such as a small stone comes flying toward the wheel speed sensor 41B from the left or right side, such as in the direction of arrow (3) of the figure or in the direction of arrow (4) of the figure, the foreign matter can be received by one of the wheel 12B, the disk plate 24B and a side wall 75b of the final gear case 75 constituting a part of the swing arm 11B.

In the case where a foreign matter comes flying in the direction of arrow (5) of the figure, the foreign matter can be received by a longitudinal rib 82. In the case where a foreign matter comes flying in the direction of arrow (6) of the figure, the foreign matter can be received by the final gear case 75.

Thus, in the case where a foreign matter comes flying toward the wheel speed sensor 41B from the front or rear side, the possibility of collision of the foreign matter on the wheel speed sensor 41B, a cable part 67B connected to the wheel speed sensor 41B or the like can be lowered, without separately providing means such as a guard member in the vicinity of the wheel speed sensor 41B for the purpose of preventing collision of foreign matter against the wheel speed sensor 41B.

Therefore, according to the present invention, the possibility of collision of foreign matter against the wheel speed sensor 41B can be lowered, without leading to an increase in the number of component parts or an increase in vehicle weight.

Incidentally, while the present invention has been applied to a motorcycle in the mode of carrying out the invention, the invention is applicable also to saddle ride type vehicles, and may naturally be applied to general vehicles.

For example, the disk brake caliper may not necessarily be disposed on the lower side of the wheel speed sensor. Instead, the disk brake caliper may be disposed on the upper side of the wheel speed sensor, and may be disposed on the rear side of the wheel speed sensor.

For example, the engaging part may not necessarily be disposed on the upper side of the wheel speed sensor. Instead, the engaging part may be disposed on the lower side of the wheel speed sensor.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A motorcycle, comprising:
a swing arm swingably provided on a body frame;
a wheel rotatably provided at an end part of said swing arm;
a disk plate attached to said wheel;
a caliper bracket provided on the body frame side thereof;
a disk brake caliper for braking said wheel by clamping said disk plate, said disk brake caliper provided on said caliper bracket; and
a wheel speed sensor for detecting the speed of said wheel, said wheel speed sensor attached to said caliper bracket,
wherein said wheel speed sensor is disposed between said swing arm and said wheel,
wherein said disk brake caliper is disposed on a lower side of said wheel speed sensor,
wherein said swing arm comprises
a drive shaft case for accommodating a drive shaft; and
a final gear case for accommodating a final gear set,
wherein said wheel speed sensor and said final gear set overlap each other in a side view of the motorcycle
wherein said final gear set includes a first final gear and a second final gear,
wherein said second final gear is attached to an output rotating body,
wherein said caliper bracket extends forward and upward from a caliper attachment portion,
wherein said wheel speed sensor is disposed at the same height as the output rotating body, and
wherein said wheel speed sensor is disposed at a position corresponding to a bearing of said output rotating body, in the width direction of the motorcycle.

2. The motorcycle of claim 1, further comprising:
an engaging part disposed on an upper side of said wheel speed sensor,
wherein said engaging part engages said caliper bracket and said swing arm together.

3. The motorcycle of claim 2, wherein
said wheel speed sensor is disposed at a position corresponding to a bearing of said output rotating body, in the width direction of the motorcycle.

4. The motorcycle of claim 1, wherein said wheel speed sensor is disposed at a position corresponding to a bearing of said first final gear, in the forward-and-backward direction of said motorcycle.

5. The motorcycle of claim 2, wherein said wheel speed sensor is disposed at a position corresponding to a bearing of said first final gear, in the forward-and-backward direction of said motorcycle.

6. The motorcycle of claim 1, wherein said wheel speed sensor is disposed at a position corresponding to a bearing of said first final gear, in the forward-and-backward direction of said motorcycle.

7. The motorcycle of claim 3, wherein said wheel speed sensor is disposed at a position corresponding to a bearing of said first final gear, in the forward-and-backward direction of said motorcycle.

* * * * *